US009822584B2

(12) United States Patent
Mullet et al.

(10) Patent No.: US 9,822,584 B2
(45) Date of Patent: Nov. 21, 2017

(54) ELECTROSTATIC DISCHARGE PROTECTION SYSTEM FOR WINDOW COVERINGS

(71) Applicant: QMotion Incorporated, Pensacola, FL (US)

(72) Inventors: Willis Jay Mullet, Gulf Breeze, FL (US); Craig Peter Anderson, Pensacola, FL (US)

(73) Assignee: The Watt Stopper, Inc., Santa Clara, CA (US)

( * ) Notice: Subject to any disclaimer, the term of this patent is extended or adjusted under 35 U.S.C. 154(b) by 0 days.

(21) Appl. No.: 14/711,086

(22) Filed: May 13, 2015

(65) Prior Publication Data

US 2015/0333510 A1    Nov. 19, 2015

Related U.S. Application Data

(60) Provisional application No. 62/000,044, filed on May 19, 2014.

(51) Int. Cl.
*H02H 7/09* (2006.01)
*E06B 9/72* (2006.01)
(Continued)

(52) U.S. Cl.
CPC ............. *E06B 9/72* (2013.01); *H01Q 1/50* (2013.01); *H02H 9/045* (2013.01); *E06B 2009/6809* (2013.01)

(58) Field of Classification Search
CPC ......... E06B 1/00; G06K 1/00; G06K 2207/00
See application file for complete search history.

(56) References Cited

U.S. PATENT DOCUMENTS 6,497,267 B1 * 12/2002 Azar ..................... E06B 9/42
160/188
7,723,939 B2 * 5/2010 Carmen, Jr. .......... E06B 9/40
318/16

(Continued)

OTHER PUBLICATIONS

Infineon Technologies, ESD Protection, Application Note No. 086, Silicon Discretes, Aug. 31, 2004, pp. 1-8.

*Primary Examiner* — Shawki S Ismail
*Assistant Examiner* — Zoheb Imtiaz
(74) *Attorney, Agent, or Firm* — Christopher A. Proskey; BrownWinick Law Firm

(57) ABSTRACT

An electrostatic discharge (ESD) circuit for use with motorized window shades includes an antenna connected to a motor controller having a printed circuit board, a receiver or transceiver, a microprocessor and memory that are connected to and operate a motor. The ESD circuit is connected to the line-in between the antenna and the downstream components of the printed circuit board. The ESD circuit includes an inductor in parallel with two anti-parallel diodes in reverse polarity to one another. The ESD circuit shunts damaging signals or ESD events to ground by providing a lower impedance or lower resistance path to ground for these signals, whereas the ESD circuit allows the signals of interest to pass by the ESD circuit as the ESD circuit provides a higher impedance or higher resistance path to ground as compared to the signal of interest passing through the receiver or transceiver of the motor controller.

16 Claims, 8 Drawing Sheets

(51) Int. Cl.
*H02H 9/04* (2006.01)
*H01Q 1/50* (2006.01)
*E06B 9/68* (2006.01)

(56) References Cited

U.S. PATENT DOCUMENTS

2008/0258666 A1* 10/2008 Carmen .................... E06B 9/68
 318/470
2011/0241967 A1* 10/2011 Kaikkonen ......... H01L 27/0248
 343/851
2014/0055061 A1* 2/2014 Chambers ................ H02P 7/00
 318/139

* cited by examiner

ELECTROSTATIC DISCHARGE PROTECTION SYSTEM FOR WINDOW COVERINGS

CROSS REFERENCE TO RELATED APPLICATION

This application claims the benefit to U.S. Provisional Application No. 62/000,044 filed May 19, 2014.

FIELD OF THE INVENTION

This invention relates to window coverings. More specifically and without limitation, this invention relates to a system for preventing damage from electrostatic discharge in motorized window coverings.

BACKGROUND OF THE INVENTION

There are countless forms window coverings. Common window coverings include honeycomb blinds, venetian blinds, drapery systems, and roller shades to name a few. Motorization and remote control of these various window coverings is an increasing trend. Motorization and remote control of these window coverings provides countless advantages and benefits. Namely, multiple window coverings can be opened and closed with the single press of a button, multiple window coverings can be programmed to open and close with the moving sun and changing seasons to improve energy efficiency, aesthetics and comfort, and window coverings positioned in inaccessible places can easily be opened and closed, among countless other advantages and improvements.

While motorizing window coverings provides many advantages, there are disadvantages. One disadvantage is that opening and closing of window coverings has a tendency to generate static electricity due to the fact that most every shade material is an insulator. It has been seen, especially under certain environmental conditions, that this build-up of static electricity has a tendency to discharge and affect the electronic components of the motorized window covering through an electrostatic discharge event (ESD event).

ESD is the sudden flow of electricity between two electrically charged objects caused by contact, an electrical short, or dielectric breakdown. A buildup of static electricity can be caused by tribocharging or by electrostatic induction. The ESD occurs when differently-charged objects are brought close together, or close enough together, or when the dielectric between them breaks down, often creating a visible spark. An ESD event is also known as a high voltage low current transient.

ESD can create spectacular electric sparks (thunder and lightning is a large-scale ESD event), but also less dramatic forms exist which may be neither seen nor heard, yet still be large enough to cause damage to sensitive electronic devices. Electric sparks require a field strength above approximately 4 kV/cm in air, as notably occurs in lightning strikes. Other forms of ESD include corona discharge from sharp electrodes and brush discharge from blunt electrodes.

ESD can cause a range of harmful effects of importance in industry, including gas, fuel vapor and coal dust explosions, as well as failure of solid state electronics components such as integrated circuits. These devices can suffer permanent damage when subjected to high voltages. Electronics manufacturers therefore establish electrostatic protective areas free of static, using measures to prevent charging, such as avoiding highly charging materials and measures to remove static such as grounding human workers, providing antistatic devices, and controlling humidity. However, such protective environmental steps cannot be taken in the normal application of window shades, leaving motorized window shades extremely susceptible to ESD events.

For the reasons stated above, and for other reasons stated below which will become apparent to those skilled in the art upon reading and understanding the specification, there is a need to provide a system that helps to prevent ESD events from affecting the electronic components of motorized window shades.

Thus, it is a primary object of the invention to provide an ESD protection system for window coverings that improves upon the state of the art.

Another object of the invention is to provide an ESD protection system for window coverings that quickly shunts ESD events to ground early in the circuit thereby protecting the downstream electronic components from damage.

Yet another object of the invention is to provide an ESD protection system for window coverings that protects against a broad range of ESD events.

Another object of the invention is to provide an ESD protection system for window coverings that is inexpensive.

Yet another object of the invention is to provide an ESD protection system for window coverings that is easy to install and use.

Another object of the invention is to provide an ESD protection system for window coverings that is usable in any form of motorized window covering.

Yet another object of the invention is to provide an ESD protection system for window coverings that is durable.

Another object of the invention is to provide an ESD protection system for window coverings that has a long useful life.

Yet another object of the invention is to provide an ESD protection system for window coverings that has an intuitive design.

Another object of the invention is to provide an ESD protection system for window coverings that has a minimum number of parts.

Yet another object of the invention is to provide an ESD protection system for window coverings that does not impede or inhibit use of the motorized window covering.

Another object of the invention is to provide an ESD protection system for window coverings that does not reduce the sensitivity of any receiver or transceiver.

Yet another object of the invention is to provide an ESD protection system for window coverings that is a passive system and does not require any additional steps to be taken by the user or installer.

Another object of the invention is to provide an ESD protection system for window coverings that does not interfere with the user experience related to the product.

Yet another object of the invention is to provide an ESD protection system for window coverings that does not require maintenance.

These and other objects, features, or advantages of the invention will become apparent from the specification and claims.

SUMMARY OF THE INVENTION

An electrostatic discharge (ESD) circuit is presented for use with motorized window shades. The motorized window shade includes an antenna connected to a motor controller having a printed circuit board, a receiver or transceiver, a microprocessor and memory among other components that are connected to and operate a motor and powered by a power source. The ESD circuit is connected to the line-in between the antenna and the downstream components of the printed circuit board. The ESD circuit includes an inductor in parallel with two anti-parallel diodes in reverse polarity to one another. The ESD circuit shunts damaging signals or ESD events to ground by providing a lower impedance or lower resistance path to ground for these signals, whereas the ESD circuit allows the signals of interest to pass by the ESD circuit as the ESD circuit provides a higher impedance or higher resistance path to ground as compared to the signal of interest passing through the receiver or transceiver of the motor controller. The ESD circuit allows signals of interest to pass to the receiver or transceiver of the motor controller while quickly shunting damaging signals ESD events to ground thereby protecting the motor controller signal while not reducing the sensitivity of the receiver or transceiver.

DETAILED DESCRIPTION

In the following detailed description, reference is made to the accompanying drawings which form a part hereof, and in which is shown by way of illustration specific embodiments in which the invention may be practiced. These embodiments are described in sufficient detail to enable those skilled in the art to practice the invention, and it is to be understood that other embodiments may be utilized and that mechanical, procedural, and other changes may be made without departing from the spirit and scope of the invention. The following detailed description is, therefore, not to be taken in a limiting sense, and the scope of the invention is defined only by the appended claims, along with the full scope of equivalents to which such claims are entitled.

As used herein, the terminology such as vertical, horizontal, top, bottom, front, back, end, sides, and the like, are referenced according to the views presented. It should be understood, however, that the terms are used only for purposes of description, and are not intended to be used as limitations. Accordingly, orientation of an object or a combination of objects may change without departing from the scope of the invention.

Figure 1:
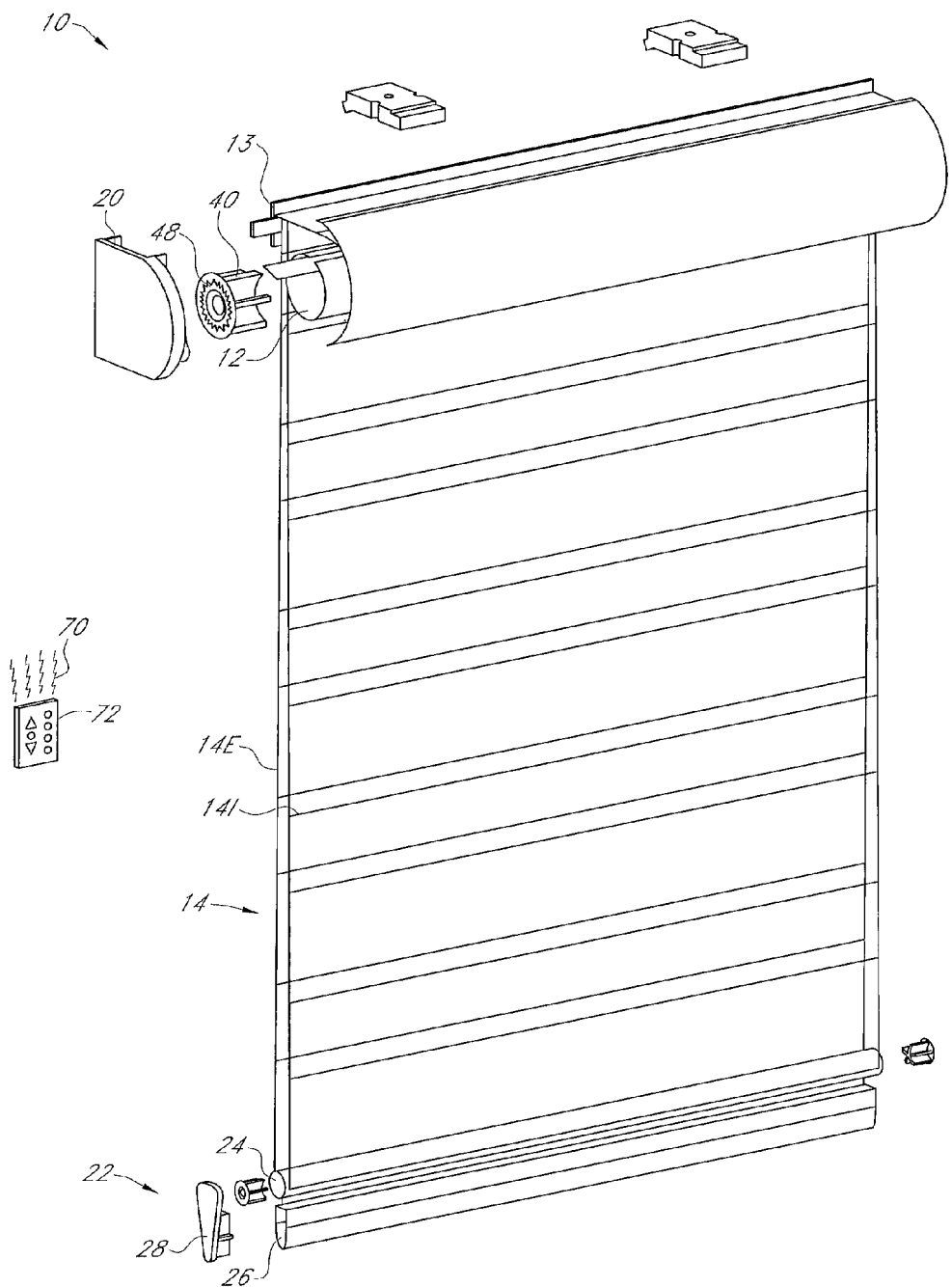
FIG. 1 is a perspective view of a window shade, known in the industry as a "zebra shade," the view showing the roller tube, the panel of fabric that wraps around the roller tube and passes through the bottom bar before attaching to the head rail of the shade, thereby forming two layers of fabric that pass one another during every opening and closing of the window shade.

With reference to FIG. 1 a motorized window covering system 10 is presented. The particular type of motorized window covering system 10 is a type of roller shade known as a "zebra shade" in the industry. This type of shade 10 is formed of a rotating tube 12 with one end of the shade material 14 connected to the tube 12. As the tube 12 rotates the shade material 14 wraps around or unwraps from the tube 12 thereby opening and closing the shade material 14. The shade material 14 of zebra type shades is formed of a plurality of staggered sections of sheer material 16 and dense material 18 that, in one arrangement, are generally rectangular in shape and of generally equal size (or alternatively, to ensure there are no light gaps in a closed position, the dense material 18 panels are slightly larger than the sheer material 16 panels). The sheer material 16 is generally formed of a mostly translucent, see-through or open material and allows for the passage light and vision, whereas the dense material 18 is mostly opaque, closed or black-out material that prevents the passage of light and vision.

The roller tube 12 connects to a structure, such as the wall of a building or a window casing, by a bracket 20 positioned adjacent each outward end of the roller tube 12. The end of the shade material 14 opposite the end connected to the roller tube 12 is affixed to a portion of the system 10 adjacent to where the shade 10 connects to the structure. In one arrangement, the end of shade material 14 opposite the end connected to the roller tube 12 is connected to head rail 13, or brackets 20, or any other portion of the system 10. This connection maintains the stationary position of the end of shade material 14 opposite the end connected to the roller tube 12. The shade material 14 passes through bottom bar assembly 22 or a portion of bottom bar assembly 22 and forms a loop, with an interior layer 14I of fabric and an exterior layer 14E of fabric separated by small space there between as well as rolling bottom bar assembly 22 positioned at the bottom of the loop of fabric.

In one arrangement, the bottom bar assembly 22 includes a roller 24 positioned within the loop formed in the shade material 14. The roller 24 is rotatably connected to an exterior housing 26 by end caps 28 positioned at the outward ends of the roller 24 and exterior housing 26 that connects the two components together.

As roller tube 12 is rotated, the shade material 14 rolls off of, or on to, the exterior surface of the roller tube 12, as the case may be. As the length of the shade material 14 changes, the weight of the bottom bar assembly 22 pulls down on the loop of the shade material 14 which causes the roller 24 to rotate within the loop of shade material 14 such that the bottom bar assembly 22 remains at the bottom of the loop of shade material 14 at all times, regardless of the length of shade material 14.

The zebra shade material 14 is used to provide a mostly dense shade system by aligning the dense material 18 panels of the interior layer 14I of fabric and an exterior layer 14E of fabric such that the shade appears to be fully formed of dense material 18. The zebra shade material 14 is also used to provide a staggered array of dense material 18 and sheer material 16 by aligning the dense material 18 panels of the interior layer 14I of fabric and an exterior layer 14E of fabric such that the dense material 18 panels horizontally align with one another (or said another way, such that the interior dense material 18 hides behind the exterior dense material 18) thereby providing a shade that appears to be formed of staggered sheer material 16 and dense material 18 allowing for partial visibility through the shade material 14.

While the functionality and aesthetics of these zebra shades is superb, a tremendous amount of static electricity is created during an opening and closing operation of the shade 10 for at least two reasons. First, during an opening and closing operation the shade material 14 must pass through the bottom bar assembly 22 with the roller 24 contacting the shade material, thereby creating friction and static. Second, during an opening and closing operation, the interior layer 14I and exterior layer 14E of shade material 14 pass close to one another (and sometimes engage one another), also creating friction and static. While a zebra shade is presented herein, this phenomena is present in all shades as the movement of shade material 14, whether it is a honeycomb shade material, a single layer of roller shade material, a single panel of drapery fabric, a pair of drapery panels, a roman shade material, venetian shade material, or any other type of shade material, static is generated by the movement of the shade material 14.

The generation of this static electricity is not a problem in manual shades as there are no electrical components that can be harmed by an ESD event. However, the generation, and dissipation, of this static electricity is a substantial problem when motorizing shades 10.

Figure 2:
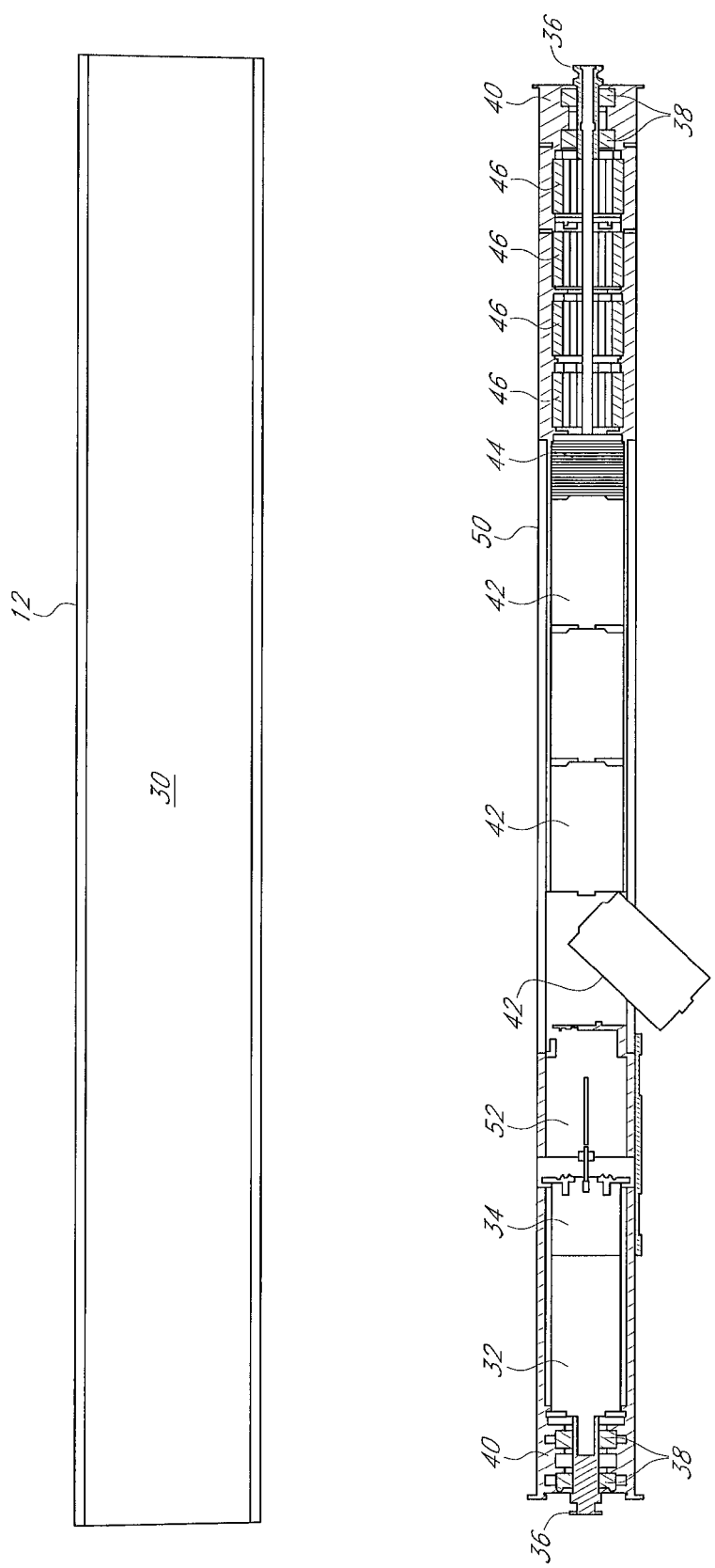
FIG. 2 is a cut-away plan view of the interior components of the roller tube of a roller shade.
Figure 3:
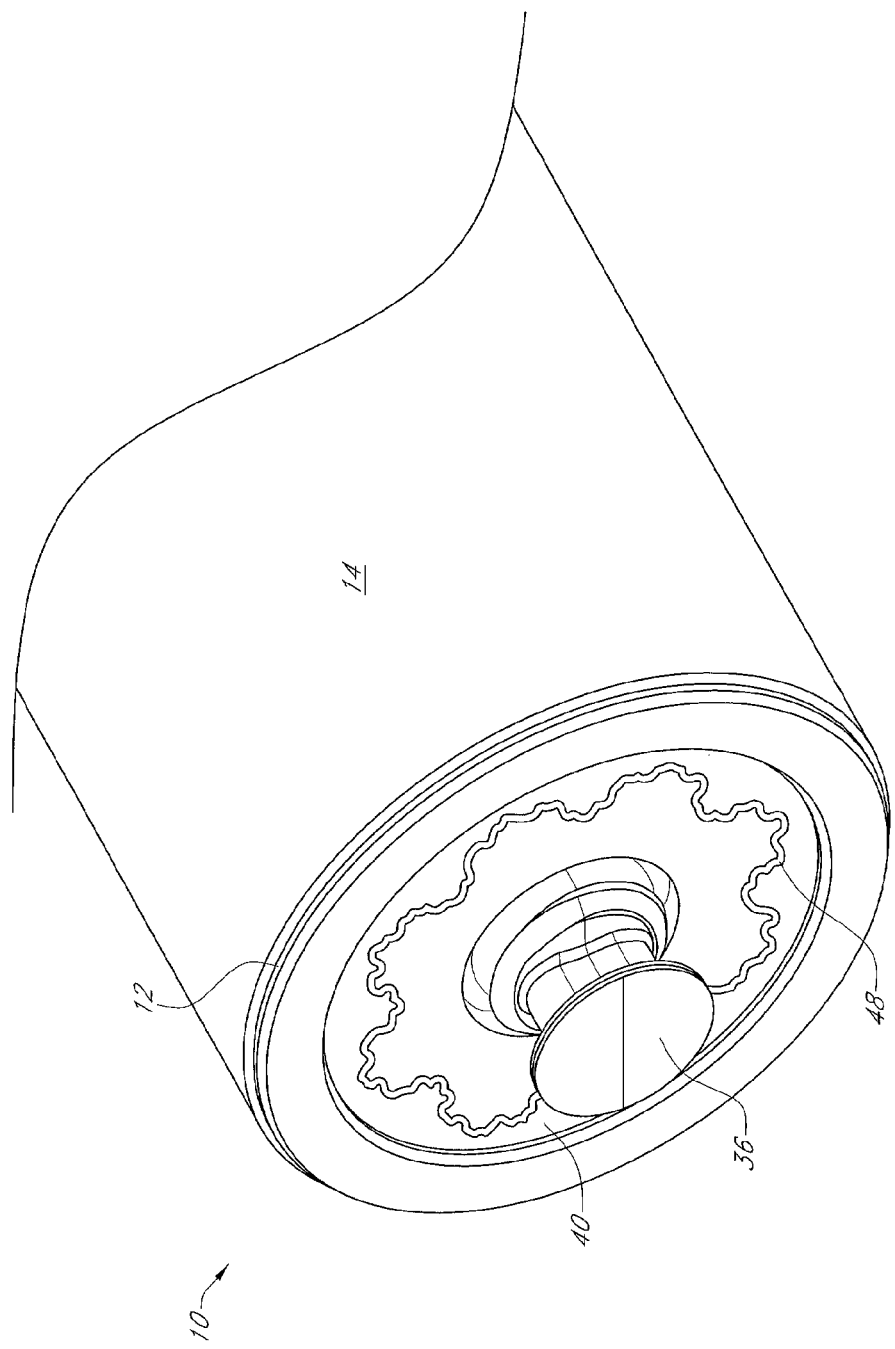
FIG. 3 is a perspective view of the end of the roller tube of the roller shade of FIG. 1.

Motorization of shade 10 can be accomplished in countless manners. In one arrangement, as is shown in FIG. 2, a plurality of electronic components are positioned within the hollow interior 30 of shade tube 12. More specifically, in this arrangement, a motor 32 is positioned within shade tube 12 and is connected with a gear box 34. In the arrangement shown, one end of the motor 32 is connected to an axel 36 that extends outwardly from the end of shade tube 12 and connects to brackets 20. Axel 36 is supported by a plurality of rotatable bearings 38 that are held within tube end cap 40. A plurality of batteries 42, which form a power source, are housed within the tube and compressed with a battery spring 44. In the arrangement shown, axel 36 remains stationary with respect to the bracket 20 while the shade tube 12 and motor 32 rotate around the stationary axel 36 thereby opening and closing the shade 10. Also, a plurality of counterbalance springs 46, such as ribbon springs, power springs or the like, are also positioned within the shade tube 12 such that one end of the counterbalance springs 46 remains stationary with axel 36 while the opposite end of the counterbalance springs 46 rotate with the shade tube 12, thereby loading the counterbalance springs 46. However, any other form, design or arrangement of a motorized window shade is hereby contemplated for use.

An antenna 48 is also connected to the system 10 in any manner. In one arrangement a fractal antenna is positioned in the end of shade tube 12 and held by tube end cap 40, as is further taught by Applicant's related patent application Ser. No. 13/286,542, filed on Nov. 1, 2011 and published on May 2, 2013 as US20130105095 entitled "Motorized roller shade or blind having an antenna and antenna cable connection" which is fully incorporated by reference herein, including any related patent applications. Alternatively, antenna 48 is any form of an antenna such as a simple monopole antenna connected to or extending outwardly from the shade tube, a meandering monopole antenna, or a loop antenna, a slot antenna, a fractal antenna or any other form of an antenna.

In one arrangement, these components are all connected to or housed in one or more housings 50 which is inserted within the hollow interior 30 of shade tube 12.

A motor controller 52 is also positioned within the shade tube 12. Motor controller 52 is operably connected to antenna 48, the power source 42 and motor 32 and controls operation of the system 10.

While these electronic components are shown and described thus far as being positioned within the hollow interior 30 of the shade tube 12, it is contemplated that these components can be positioned outside of the shade tube 12 without departing from the spirit, scope, and functionality of this arrangement.

Figure 4:
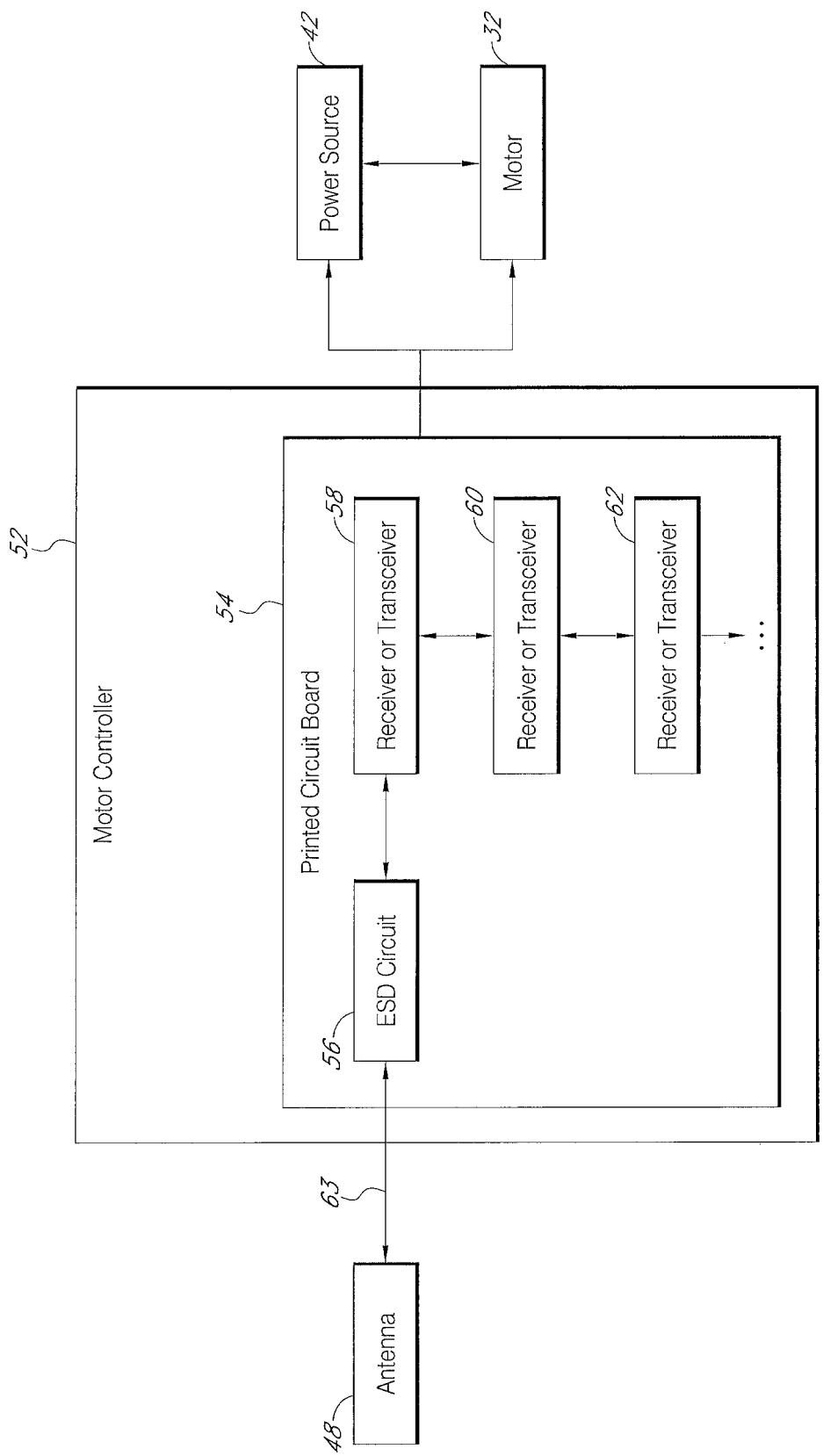
FIG. 4 is a plan view of the electronic components of the system.
Figure 5:
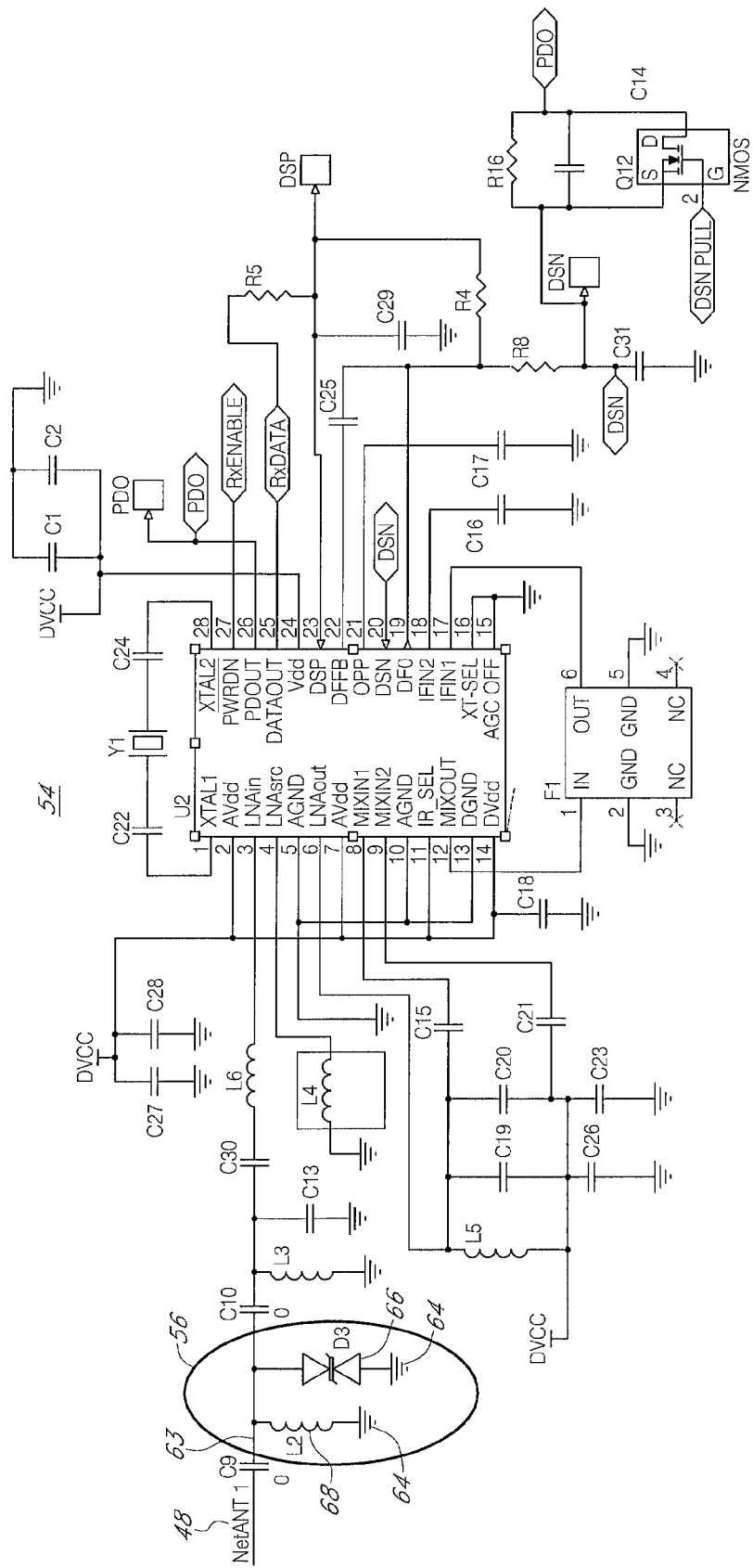
FIG. 5 is a detailed plan view of the layout of the printed circuit board of the system.
Figure 6:
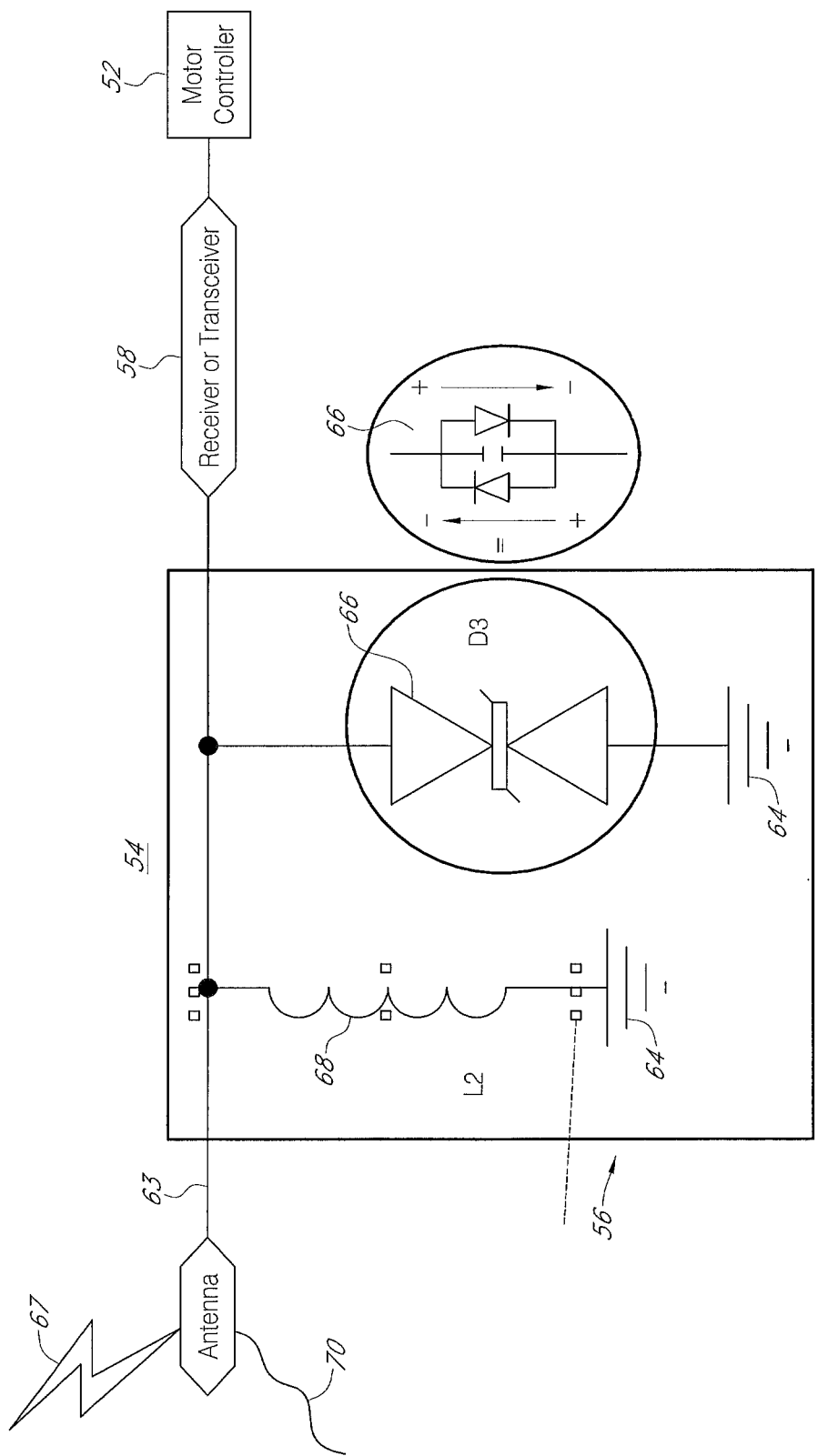
FIG. 6 is a close up plan view of the ESD circuit of the printed circuit board of the system.
Figure 7:
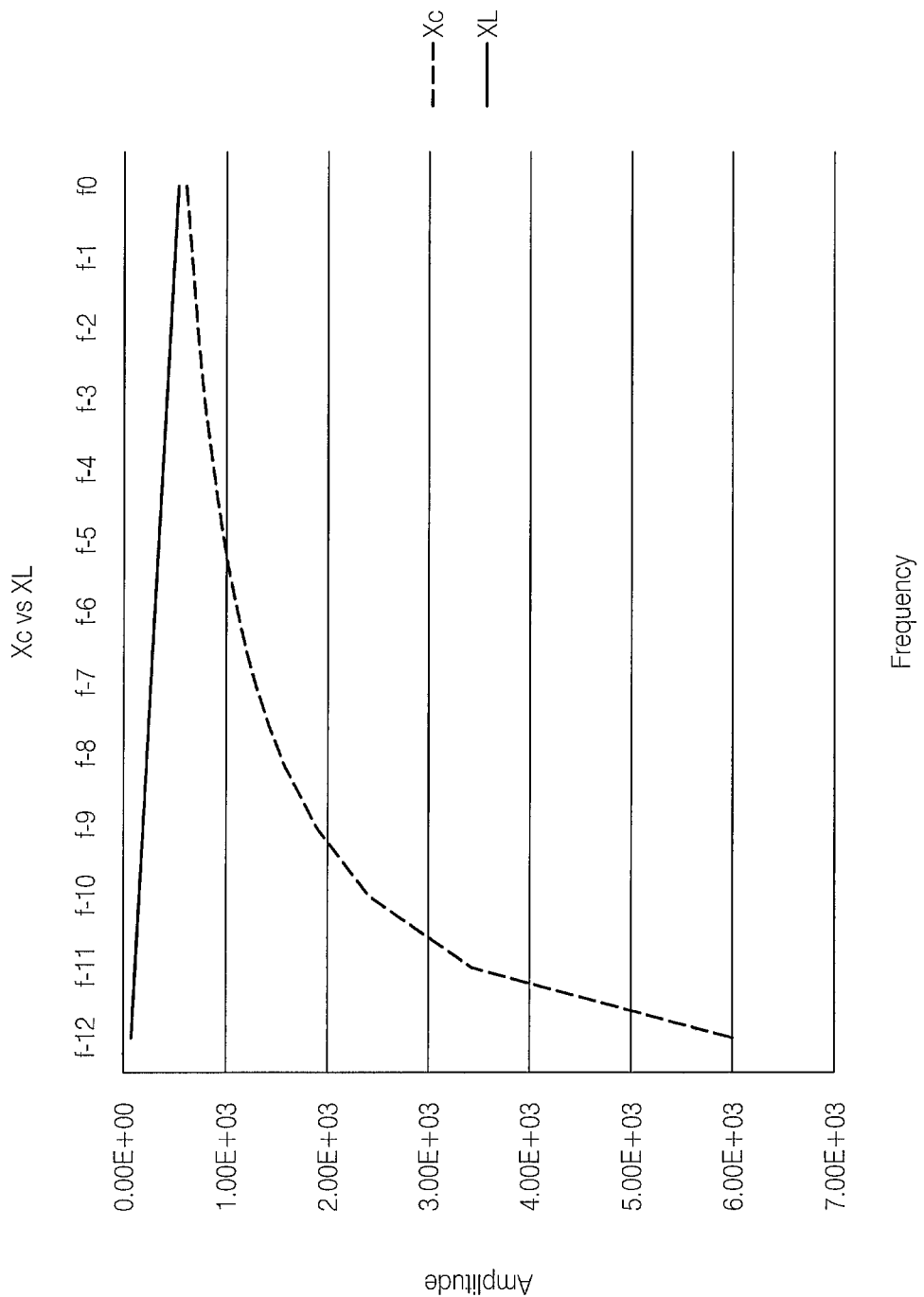
FIG. 7 is a plan view of a graph of the frequency v. the amplitude of the ESD circuit showing $X_C$ and $X_L$.
Figure 8:
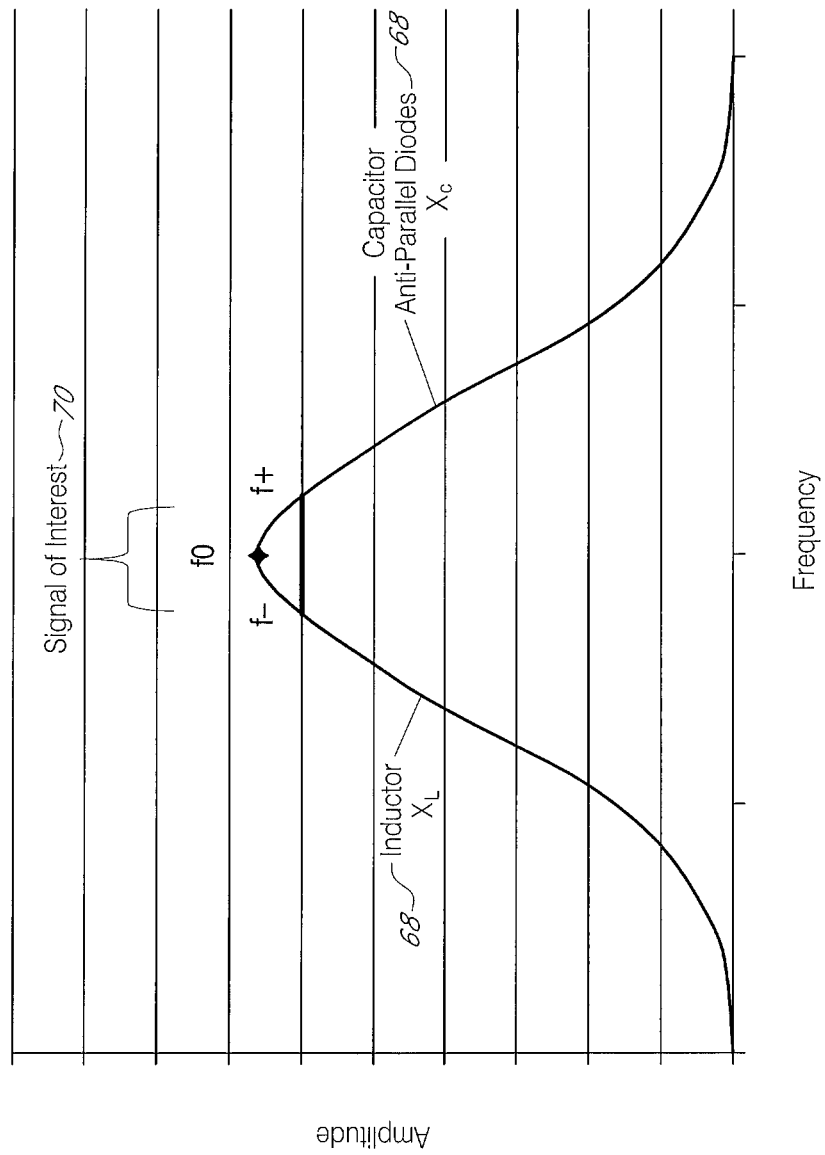
FIG. 8 is a plan view of a graph of the frequency v. the amplitude of the ESD circuit showing $X_C$ and $X_L$ and showing the $F_0$ or signal of interest.

With reference to FIG. 4, it is shown that antenna 48 is electrically connected to the printed circuit board 54 of motor controller 52. An ESD circuit 56 is positioned between antenna 48 and receiver or transceiver 58, microprocessor 60, memory 62 and any other components of the motor controller 52. Collectively, these other components of the printed circuit board 54 shall be referred to as the "downstream components" and which includes receiver or transceiver 58, microprocessor 60, and memory 62, among others.

Antenna 48 receives signals from the air and transmits them through ESD circuit 56 and into receiver or transceiver 58. Receiver or transceiver 58 is any component that receives signals and interprets them and transmits them to other components, such as the microprocessor 60. A receiver communicates using one-way communication, meaning that it operates to receive signals and forward them on; whereas a transceiver communicates using two-way communication, havening the capability to both receive signals from antenna 48 and forwarding them to microprocessor 60 as well as receiving signals from microprocessor 60, or another component, and transmit or broadcast them through antenna 48. Because wireless control signals, such as those transmitted by a remote control, are of incredibly low strength or power, antenna 48 provides a low impedance input (or low resistance input) by line-in 63 into receiver or transceiver 58. This low impedance input (or low resistance input) line-in 63 allows for the maximum strength and clarity of the wireless control signal sent by the remote control to be transmitted to the receiver or transceiver 58, or said another way, this low impedance input (or low resistance input) line-in 63 reduces or prevents interference with or the reduction of strength or clarity of the wireless control signals broadcast by the remote control. This low impedance input (or low resistance input) line-in 63 allows receiver or transceiver 58 to be sensitive to weak control signals from the remote control.

Microprocessor 60 is any device which receives signals and processes them based on instructions stored in memory 62. Memory 62 is any form of a device which data storage device such as flash, RAM, DRAM or the like. While in FIG. 4, receiver or transceiver 58, microprocessor 60 and memory 62 are shown as single independent components positioned on printed circuit board 54, it is hereby contemplated that these components 58, 60, 62 and others may be formed together as a single multi-function component, or these components 58, 60, 62 may be formed of multiple independent.

Without the ESD circuit 56, it was found that a static charge would build up on the shade material 14 and/or the bottom bar assembly 22. Often, as the bottom bar assembly 22 would near the shade tube 12 an electrostatic discharge (ESD event) would occur as there would be a charge imbalance between the bottom bar assembly 22 and the head rail 13. This electrostatic discharge would tend to enter the antenna 48 and be transmitted directly to the components positioned on the printed circuit board 54, often having catastrophic effects such as permanent destruction to the components of the printed circuit board 54, such as the receiver or transceiver 58, or other times the microprocessor 60 or memory 62 or other components.

These ESD events tend to occur because a charge seeks the easiest or lowest resistance path to ground, which the antenna 48 provided through the printed circuit board 54 and the components thereon. In addition, the antenna 48 lacked any capability to differentiate between damaging signals (such as an electrostatic discharge) and normal signals (such as a wireless command signal from a remote control).

ESD Circuit:

To prevent such a damaging electrostatic discharge from entering the downstream components of the printed circuit board 54 an ESD circuit 56 is positioned in or on the line-in 63 between the antenna 48 and the downstream components of the printed circuit board 54, such as the receiver or transceiver 58. The damaging signals (a.k.a. an electro static discharge or ESD event) are short duration static discharges. That is they have a short period and thus a high frequency and can be either positive or negative. In addition, they are transient. Meaning they are a one-time event.

It would unacceptable to place a conventional or normal filter on the line-in 63 to prevent these ESD events from reaching the downstream components of printed circuit board 54 as such a filter would add parasitic capacitance to the line-in 63 and change the sensitivity of the receiver or transceiver 58. As such a conventional or normal filter cannot be used to prevent an ESD event from reaching the downstream components of printed circuit board 54. This is especially true in a battery powered motorized window covering system 10.

To prevent an ESD event from reaching the downstream components of printed circuit board 54, one solution is to add an ESD circuit 56 across the input or line-in 63 from the antenna 48 to the downstream components of the printed circuit board 54 such as receiver or transceiver 58. This ESD circuit 56 is shunted across the line-in and opens up to provide a path of least resistance or least impedance to ground 64 during an ESD event. As such, during an ESD event the electrostatic discharge will take the path of least resistance or least impedance to ground 64 instead of entering the other components of the printed circuit board 54 such as receiver or transceiver 58.

The ESD circuit 56 includes two anti-parallel diodes 66, which may or may not be packaged in a single package, that are connected in parallel but with reversed polarities. The two anti-parallel diodes 66 are used with reversed polarities because the ESD event may be positive or negative, and each of the two anti-parallel diodes 66 protect against an ESD event in one of the directions, either positive or negative. These anti-parallel diodes 66 quickly shunts the damaging signal or ESD event 67 (represented as a spark or lightning bolt) to ground 64 by quickly providing a path of least resistance or least impedance to ground 64 that the ESD event will take. These anti-parallel diodes 66 have their own capacitance and require an inductor 68 to counter their capacitance. This in effect creates a band pass filter to ground 64 for the damaging signal or ESD event 67 and a blocking filter for the signal of interest 70 (represented as a wavelength on the figures) and a band reject filter for the damaging signal or ESD event 67 to pass to ground 64. The signal of interest 70, in one arrangement, is a wireless control signal transmitted by a battery powered remote control 72, or any other device, configured to transmit wireless control signals. The signal of interest 70, in one arrangement, is broadcast on a specific frequency, or a specific range of frequencies by remote control 72 which is tuned to operate on this specific frequency or specific range of frequencies. In corresponding nature, the antenna 48 and receiver or transceiver 58 are similarly tuned to receive and interpret signals of interest 70, or wireless control signals, on this specific frequency or specific range of frequencies. As examples, the signals of interest 70 may be 306 MHz, 401 MHz, 708 MHz, 907 MHz, 868 MHz or any other frequency or any range of frequencies.

In this arrangement, the damaging signal or ESD event 67 does not enter the downstream components of the printed circuit board 54 because the ESD circuit 56 creates a path of lower resistance or lower impedance to ground 64 as compared to going through the printed circuit board 54. In contrast, at the frequency or range of frequencies of the signal of interest 70, the inductor 68 and antiparallel diodes 66 create a higher resistance or higher impedance path to ground 64 for the signal of interest 70 and therefore the signal of interest 70 is transmitted to the downstream components of the printed circuit board 54 such as the receiver or transceiver 58.

One problem associated with the use of the pair of anti-parallel diodes is that the antiparallel diodes 66 have an inherent capacitance that changes the frequency response of the downstream components of the printed circuit board 54.

To counter the effect of the capacitance of the antiparallel diodes 66, an inductor 68 is added in parallel to the anti-parallel diodes 66 thus creating a resonant circuit (or ESD circuit 56). The resonant circuit (ESD circuit 56) is calculated such that both the $X_C$ and the $X_L$ are sufficiently high at our frequency ($F_0$) to minimizing the response of the resonant circuit (or ESD circuit 56) at the intended frequency (our signal of interest 70 or wireless control signal). More specifically:

$X_C$=Impedance that the capacitor (anti-parallel diodes 66) contributes to the ESD circuit 56=1/(capacitance (2*Π*Frequency))

$X_L$=Impedance that the inductor 68 contributes to the ESD circuit 56=(inductor(2*Π*Frequency))

$F_0$=Frequency of interest or signal of interest 70 or wireless control signals from remote control 72

As can be seen, there is an inverse relationship of $X_C$ and $X_L$ that varies with the frequency. This has the effect of passing the small RF signal (our signal of interest 70 or wireless control signals) to the downstream components of the printed circuit board 54, such as the receiver or transceiver 58 which is effectively the low impedance path to ground 64 for these signals.

In the instant that the ESD circuit 56 experiences a high voltage transient (an ESD event 67), one of the anti-parallel diodes 66 experience a voltage sufficient to overcome the threshold voltage ($V_T$) of the anti-parallel diode 66, whether forward or reverse bias (positive or negative), and opens a direct path to ground 64.

During this high voltage transient event the anti-parallel diodes 66 are the operative components. The downstream components of the printed circuit board 54, such as the receiver or transceiver 58 are effectively disconnected from the antenna 48 by the path to ground 64 created by the anti-parallel diode 66.

During a low power event, such as normal operation, which is the predominant state, the inductor 68 and the capacitance from the anti-parallel diodes 66 are the operative components. From the charts that follows we can see that the $X_L$ is low for the low frequencies and rises as the frequency rises. The $X_C$ is maximum during the low frequencies and decreases as the frequency increases. Thus for the lower frequencies, lower than $F_0$, the inductor 68 allows a low impedance path to ground. Then for frequencies higher than $F_0$ the capacitance of the anti-parallel diodes 66 allows a low impedance path to ground. Thus for $F_0$ (including the acceptable range of signals from F− to F+) both the $X_C$ and $X_L$ are relatively high in comparison to the impedance of the downstream components of printed circuit board 54, or the receiver or transceiver 58, allowing the RF signal to pass to the receiver or transceiver 58 as the path to ground through the receiver or transceiver 58 is the low impedance path to ground at $F_0$.

For purposes of further clarity, and to show the disparity between the signals of interest 70 (or wireless control signals) and damaging signals 67 (or ESD events), the strength, energy or power of wireless control signals 70 transmitted by remote control 72 is regulated in the U.S. by the Federal Communications Commission (FCC). At the present time, the FCC dictates that the maximum output for remote control 72 to control motorized window covering system 10 under standard conditions is 1 milliwatt (which is equal to one thousandth of a watt, or $10^{-3}$ of a watt). (Note: in terms of electromagnetism, one watt (W) is the rate at which work is done when one ampere (A) of current flows through an electrical potential difference of one volt (V). The relationship between watts, volts and amps is as follows W=V*A).

While the remote control 72 may transmit the signals of interest 70 (or wireless control signals) beginning at 1 milliwatt, the strength, power or intensity of the signal diminishes over distance and therefore the strength, power or intensity of the signals of interest 70 (or wireless control signals) received at antenna 48 is substantially below 1 milliwatt.

That is, due to the inverse-square law, which states that a specified physical quantity or intensity is inversely proportional to the square of the distance from the source of that physical quantity. Mathematically formulated it is as follows: Intensity $\alpha$ $(1/(distance^2))$.

More specifically, the inverse-square law states that the intensity (or illuminance or irradiance) of light or other linear waves radiating from a point source (energy per unit of area perpendicular to the source) is inversely proportional to the square of the distance from the source; so an object (of the same size) twice as far away, receives only one-quarter the energy (in the same time period).

More generally, the irradiance, i.e., the intensity (or power per unit area in the direction of propagation), of a spherical wavefront varies inversely with the square of the distance from the source (assuming there are no losses caused by absorption or scattering).

For example, the intensity of radiation from the Sun is 9126 watts per square meter at the distance of Mercury (0.387 AU); but only 1367 watts per square meter at the distance of Earth (1 AU)—an approximate threefold increase in distance results in an approximate nine fold decrease in intensity of radiation.

As such, it is common that while the signals of interest 70 (or wireless control signals) are transmitted at or just below 1 milliwatt (0.001 watts) the strength, power or intensity of the signals of interest 70 (or wireless control signals) received at antenna 48 are in the range of nanowatts, picowatts or femtowatts. The nanowatt is equal to one billionth $(10^{-9})$ of a watt. The picowatt is equal to one trillionth $(10^{-12})$ of a watt. The femtowatt is equal to one quadrillionth $(10^{-15})$ of a watt. Due to the minimal power, strength or intensity of these signals of interest 70 (or wireless control signals), the line-in 63 is essentially an open circuit straight to the receiver or transceiver 58 so as to conserve as much of the strength, power or energy of the signals of interest 70 (or wireless control signals) so that they can be received and interpreted by receiver or transceiver 58 with the highest sensitivity and clarity.

While the line-in 63 provides a direct line into the receiver or transceiver 58 to provide the greatest sensitivity and clarity, this also provides a direct route for damaging signals 67 (or ESD events). In contrast to the low power signals of interest 70 (or wireless control signals), a damaging signals 67 (or ESD events) have a substantially higher voltage. A transient ESD event 67 may range from 1,000 volts to 100,000 volts. The voltage of the ESD events 67 is related to the distance or gap that the ESD event 67 jumps. It has been tested that an ESD event 67 that jumps approximately a quarter of an inch equals about 25,000 volts; whereas an ESD event 67 that jumps approximately an inch equals about 100,000 volts. While some electronic components can be designed to withstand smaller ESD events 67, it has been tested that without ESD circuit 56 on line-in 63, the receiver or transceiver 58 often succumbs to a single ESD event 67 at and above 8,000 volts. In contrast, with ESD circuit 56 in place on line-in 63, it has been tested that receiver or transceiver 58 can withstand multiple, repeated, and even systematic ESD events in the range of 25,000 volts to 100,000 volts as these ESD events 67 are quickly shunted to ground, while not reducing the sensitivity of receiver or transceiver 58. Accordingly, the presence ESD circuit 56 on line-in 63 provides a substantial level of protection to receiver or transceiver 58 as well as all other downstream components of motor controller 52.

From the above discussion and the accompanying drawings and claims it will be appreciated that the ESD protection system for window coverings presented offers many advantages over the prior art. That is, the system presented offers improves upon the state of the art; quickly shunts ESD to ground early in the circuit thereby protecting the downstream electronic components from damage; protects against a broad range of ESD events; does not reduce the sensitivity of the system; is inexpensive; is easy to install and use; is usable in any form of motorized window covering; is durable; has a long useful life; has an intuitive design; has a minimum number of parts, among countless other advantages and improvements.

It will be appreciated by those skilled in the art that other various modifications could be made to the device without parting from the spirit and scope of this invention. All such modifications and changes fall within the scope of the claims and are intended to be covered thereby. It should be understood that the examples and embodiments described herein are for illustrative purposes only and that various modifications or changes in light thereof will be suggested to persons skilled in the art and are to be included within the spirit and purview of this application.

What is claimed is:

1. A motorized window covering, comprising:
   a motor;
   a power source operably connected to the motor;
   shade material operably connected to the motor such that the shade material is opened and closed by operation of the motor;
   a motor controller operably connected to the motor;
   an antenna connected to the motor controller by a line-in; and
   an Electrostatic Discharge circuit connected to the line-in, wherein the Electrostatic Discharge circuit includes an inductor positioned in parallel with two anti-parallel diodes positioned in reverse polarities to one another, the inductor and the two anti-parallel diodes form a resonant circuit, the inductance of the inductor is about equal to $1/(C*(2*pi*fo)^2)$, where C is equal to the capacitance of the pair of anti-parallel diodes and fo is equal to a frequency of interest, and the Electrostatic Discharge circuit shunts Electrostatic Discharge events to ground thereby preventing Electrostatic Discharge events from reaching downstream components of the motor controller.

2. The motorized window covering of claim 1 wherein an Electrostatic Discharge event is a high voltage low current transient event.

3. The motorized window covering of claim 1 wherein an Electrostatic Discharge event is a transient event above a predetermined voltage.

4. The motorized window covering of claim 1 wherein an Electrostatic Discharge event is a transient event below a predetermined voltage.

5. The motorized window covering of claim 1 wherein an Electrostatic Discharge event is a transient event above or below a predetermined voltage.

6. The motorized window covering of claim 1 wherein there are no inductors between the inductor and the two anti-parallel diodes.

7. The motorized window covering of claim 1 wherein the Electrostatic Discharge circuit creates a path of lower impedance to ground for Electrostatic Discharge events while creating a path of higher impedance to ground for signals of interest.

8. The motorized window covering of claim 1 wherein the Electrostatic Discharge circuit creates a path of lower resistance to ground for Electrostatic Discharge events while creating a path of higher resistance to ground for signals of interest.

9. The motorized window covering of claim 1 wherein the line-in connects to a receiver or transceiver.

10. The motorized window covering of claim 1 wherein the motor controller includes a receiver or transceiver, a microprocessor and memory.

11. The motorized window covering of claim 1 wherein the shade material is connected to a rotatable tube wherein the motor and power source are positioned within the rotatable tube.

12. The motorized window covering of claim 1 wherein the antenna is selected from the group consisting of a monopole antenna, a loop antenna, a meandering monopole antenna, a fractal antenna and a slot antenna.

13. The motorized window covering of claim 1 wherein the power source is a plurality of batteries.

14. The motorized window covering of claim 1 wherein the Electrostatic Discharge circuit is tuned to allow passage of signals of interest on a predetermined specific range of frequencies.

15. The motorized window covering of claim 1 further comprising a remote wirelessly connected to the antenna wherein the remote is programmed to transmit signals of interest on a predetermined specific range of frequencies.

16. The motorized window covering of claim 1 wherein the shade material generates an Electrostatic Discharge event.

\* \* \* \* \*